(12) United States Patent
Mazzarolo et al.

(10) Patent No.: US 12,310,432 B2
(45) Date of Patent: May 27, 2025

(54) WEARABLE PROTECTION DEVICE

(71) Applicant: ALPINESTARS RESEARCH S.P.A., Maser (IT)

(72) Inventors: Giovanni Mazzarolo, Coste di Maser (IT); Lorenzo Nardo, Ponzano Veneto (IT)

(73) Assignee: ALPINESTARS RESEARCH S.P.A., Maser (IT)

( * ) Notice: Subject to any disclaimer, the term of this patent is extended or adjusted under 35 U.S.C. 154(b) by 78 days.

(21) Appl. No.: 17/773,518

(22) PCT Filed: Nov. 4, 2020

(86) PCT No.: PCT/EP2020/080889
§ 371 (c)(1),
(2) Date: Apr. 29, 2022

(87) PCT Pub. No.: WO2021/089585
PCT Pub. Date: May 14, 2021

(65) Prior Publication Data
US 2022/0361600 A1   Nov. 17, 2022

(30) Foreign Application Priority Data
Nov. 5, 2019 (IT) .................. 102019000020416

(51) Int. Cl.
*A41D 13/018* (2006.01)
*A41D 1/00* (2018.01)
(Continued)

(52) U.S. Cl.
CPC ........... *A41D 13/018* (2013.01); *A41D 1/002* (2013.01); *G01L 19/083* (2013.01); *G01L 23/08* (2013.01);
(Continued)

(58) Field of Classification Search
CPC .. A41D 13/018; A41D 13/0531; A41D 1/002; G01L 19/083; G01L 19/10;
(Continued)

(56) References Cited

U.S. PATENT DOCUMENTS

| 4,397,046 A | * | 8/1983 | Steiner | ................ | A41D 13/018 |
| | | | | | 2/908 |
| 5,056,558 A | * | 10/1991 | Rodgers | ............... | B61D 45/008 |
| | | | | | 137/557 |

(Continued)

FOREIGN PATENT DOCUMENTS

| DE | 19838022 C1 | * | 5/2000 | ........... | A41D 13/018 |
| DE | 102010002139 A1 | | 8/2011 | | |

(Continued)

OTHER PUBLICATIONS

PCT International Search Report and Written Opinion dated Feb. 3, 2021 for International Application No. PCT/EP2020/080889, from which the instant application is based, 9 pgs.

*Primary Examiner* — Grace Huang
(74) *Attorney, Agent, or Firm* — Fredrikson & Byron, P.A.

(57) ABSTRACT

Wearable protection device including at least one inflatable bag configured to assume alternately a rest configuration in a deflated state, and an active configuration in an inflated state, and inflation means in fluid communication with the inflatable bag and configured to introduce therein an inflation fluid once they have been triggered. The wearable protection device further includes at least one pressure detecting device associated with the at least one inflatable bag and configured for directly or indirectly detecting the pressure inside the at least one inflatable bag. A method for evaluating if an inflatable bag of a wearable protection device is reusable once it has been inflated.

16 Claims, 4 Drawing Sheets

(51) Int. Cl.
  *G01L 19/00* (2006.01)
  *G01L 19/08* (2006.01)
  *G01L 23/08* (2006.01)
  *G01M 3/32* (2006.01)

(52) U.S. Cl.
  CPC ... *G01M 3/3272* (2013.01); *G01L 2019/0053* (2013.01)

(58) Field of Classification Search
  CPC . G01L 19/12; G01L 23/08; G01L 2019/0053; G01M 3/3272; B60R 21/16; G08B 21/02
  USPC .......................................................... 2/456
  See application file for complete search history.

(56) References Cited

U.S. PATENT DOCUMENTS

| | | | | |
|---|---|---|---|---|
| 5,184,844 A | * | 2/1993 | Goor | B60R 21/18 280/808 |
| 5,362,098 A | * | 11/1994 | Guill | B64D 25/00 244/122 AG |
| 5,402,535 A | * | 4/1995 | Green | A41D 13/0512 2/415 |
| 5,466,002 A | | 11/1995 | Tanaka et al. | |
| 5,535,446 A | * | 7/1996 | Pusic | A42B 3/0486 2/463 |
| 5,864,295 A | * | 1/1999 | Jarocha | B60R 21/01516 200/85 A |
| 6,125,478 A | * | 10/2000 | Alaloof | A41D 13/018 2/456 |
| 6,270,386 B1 | * | 8/2001 | Visocekas | A63B 29/021 441/89 |
| 7,328,464 B2 | * | 2/2008 | Lee | A41D 13/018 2/102 |
| 7,543,846 B2 | * | 6/2009 | Makabe | B60R 21/01 340/432 |
| 7,663,502 B2 | * | 2/2010 | Breed | B60R 25/25 340/7.29 |
| 8,095,994 B2 | * | 1/2012 | Natonson | A61H 9/0078 2/102 |
| 8,122,763 B2 | * | 2/2012 | Fundak | A62B 9/006 128/204.22 |
| 8,141,900 B2 | * | 3/2012 | Yamazaki | B60R 21/01 280/736 |
| 8,897,969 B2 | * | 11/2014 | Shigemura | B60R 21/015 701/1 |
| 9,770,624 B2 | * | 9/2017 | Bender | A43B 5/0415 |
| 9,788,588 B2 | * | 10/2017 | Allen | A42B 3/12 |
| 10,001,346 B2 | * | 6/2018 | Augustine | F41H 1/00 |
| 10,585,015 B2 | * | 3/2020 | Thenard | G01M 3/3272 |
| 2010/0326172 A1 | * | 12/2010 | Voute | G01M 3/3218 73/40.7 |
| 2012/0060267 A1 | * | 3/2012 | Blenkarn | A63B 29/00 2/456 |
| 2013/0210153 A1 | * | 8/2013 | Bottcher | B65D 81/2061 436/1 |
| 2015/0173433 A1 | | 6/2015 | Mazzarolo et al. | |
| 2016/0183607 A1 | * | 6/2016 | Lopez Yunez | A61F 5/028 2/455 |
| 2017/0224031 A1 | | 8/2017 | Raanan | |
| 2017/0325521 A1 | | 11/2017 | Li | |
| 2017/0340472 A1 | * | 11/2017 | Turner | A61F 5/028 |
| 2020/0205488 A1 | * | 7/2020 | Bouquillard De Milleret | A41D 13/0543 |
| 2021/0052024 A1 | * | 2/2021 | Mazzarolo | G06F 11/3058 |
| 2022/0054323 A1 | * | 2/2022 | Cameron | A61F 13/085 |

FOREIGN PATENT DOCUMENTS

| | | | | |
|---|---|---|---|---|
| JP | 2004508235 A | | 3/2004 | |
| JP | 2004338556 A | * | 12/2004 | |
| JP | 2017-526825 A1 | | 9/2017 | |
| JP | 2018-003234 A | | 1/2018 | |
| KR | 1020150023422 A | | 3/2015 | |
| WO | WO-0154523 A1 | * | 8/2001 | ........... A41D 13/018 |

* cited by examiner

WEARABLE PROTECTION DEVICE

RELATED APPLICATIONS

This application is a 35 U.S.C. 371 national stage filing from International Application No. PCT/EP2020/080889, filed Nov. 4, 2020, which claims priority to Italian Application No. 102019000020416, filed Nov. 5, 2019, the teachings of which are incorporated herein by reference.

FIELD OF THE INVENTION

The present invention relates to wearable protection devices, in particular to wearable protection devices provided with inflatable members, also called airbags, that can be worn to protect users from impacts and/or falls.

BACKGROUND

Wearable protection devices have been developed to protect users from injuries caused by impacts against obstacles during different kind of activities, such as motorcycle riding, walking and/or industrial working activities.

For sake of clarity, in the continuation of the present description reference will be made, in a not limiting way, to an inflatable wearable protection device suitable for being worn by a motorcyclist.

Typically, an inflatable wearable protection device comprises an inflatable bag or airbag which, during normal use of the wearable protection device, is arranged in a deflated state, or rest configuration, inside a casing configured to be worn by the motorcyclist.

The inflatable bag is intended to be activated only in the event of a danger situation and, for this purpose, the inflatable bag is in fluid communication with at least one inflation means, typically an inflator device in the form of a gas cartridge.

The gas cartridge is generally housed inside a housing of the wearable protection device and is adapted to introduce into the inflatable bag a predefined quantity of an inflation fluid, like for example compressed gas, such as to inflate, and therefore expand, the inflatable bag.

The inflation of the inflatable bag by the inflation means can be electronically or mechanically controlled. In case of an electronic activation, the wearable protection device comprises an electronic control unit which constantly monitors the movements of the motorcyclist and the forces acting on the wearable protection device by means of a plurality of sensors, preferably applied on the wearable protection device.

More specifically, the control unit is able to compare at regular time intervals the data detected by the sensors, arranged for example on the wearable protection device or on the motorcycle, with an algorithm which is pre-loaded inside it.

If, on the basis of this algorithm, the data detected by the sensors indicate a danger situation, the control unit transmits a triggering signal to the inflation means for inflating the inflatable bag. As a result, the inflatable bag passes from its rest configuration to an active or inflated configuration.

After the triggering of the inflation means, the inflatable bag has to remain in the inflated configuration for a predetermined time period, maintaining the internal pressure of the inflatable bag above a reference value in order to give the user a complete protection.

As it is well known in the art, different types of inflatable bag can be used. Some airbags, as the OPW (one piece woven) airbags or the airbags formed by two layers of a polymeric material welded in a discontinuous way along their edges, are able to remain inflated for a limited time period, as for example 5-7 seconds.

These airbags can further comprise a valve for controlled deflation of the inflatable bag once the protection function has been accomplished.

Other kinds of airbags, as the airbags formed by polymeric layers continuously welded along their edges, are designed to maintain a predetermined gas pressure there inside for a longer time than the above indicated airbags.

These latter airbags are defined as airtight airbags and, usually, are deflated by detaching them from the inflation means.

Once the inflation means have been activated and the bag has been inflated, at least the gas cartridge has to be replaced with a new cartridge filled with compressed gas.

As for this aspect, many types of wearable protection devices foresee the possibility for the user to autonomously replace the exhaust cartridge.

Also the bag is to be replaced since during a crash it is normally difficult to guarantee that the inflatable bag has not undergone some damages.

As a matter of fact, the bag can undergo scratches or mechanical stresses during inflation.

These damages compromise the capacity of the bag to remain inflated for a predetermined time period once it has been inflated for the first time and thus prevent the inflatable bag to be reused according with the safety standards.

In this case, the inflatable bag has to be replaced in order to reuse the wearable protection device in safety conditions.

A disadvantage of these solutions is that the replacement of the inflatable bag is a complex work, which requires to be done by an expert and trained person.

Another disadvantage consists in that the check of the inflatable bag for evaluating potential damages thereof, which can lead to a loss of the pressure retaining capacity of the bag after inflation, is a difficult task and it cannot be done by a simple visual checking.

Thus, there is the risk that a damaged bag is used anyway or, on the contrary, that the inflatable bag is replaced even if it could be reused because it has no damages or only limited damages.

In view of the above problems, the check and replacement procedures need to be performed by a service center of a dealer or of the manufacturer and thus they require a certain amount of time, during which the user cannot use the wearable protection device.

BRIEF SUMMARIES OF OBJECTS OF THE INVENTION

The main object of the present invention is therefore to provide a wearable protection device with an inflatable bag, configured to overcome or at least reduce the drawbacks above mentioned.

More specifically, the main object of the present invention is to provide a wearable protection device with an inflatable bag, which allows to automatically control the status of the inflatable bag after inflation, and thus if the inflatable bag can be reused after having been inflated according to safety standards.

A further object of the present invention is to provide a wearable protection device with an inflatable bag which allows to control the status of the inflatable bag after inflation without the intervention of a trained person.

Another object of the present invention is to provide a wearable protection device with an inflatable bag which needs less time to control the status of the inflatable bag with respect to the known wearable protection devices.

The above mentioned objects, and other objects that will better appear in the following of the present description, are achieved by a wearable protection device as defined in the attached independent claim 1 and with a method for evaluating if an inflatable bag of a wearable protection device is reusable once it has been inflated according to claim 14.

BRIEF DESCRIPTIONS OF THE DRAWINGS

The advantages and the characteristic features of the invention will appear more clearly from the following description of a preferred, but not exclusive, embodiment of a wearable protection device with reference to the accompanying figures in which.

DETAILED DESCRIPTION OF EMBODIMENTS OF THE INVENTION

With reference to the attached figures, a wearable protection device provided in accordance with the present invention is indicated in general with the reference number 1.

Preferably, the wearable protection device 1 is designed to be worn by motorcyclists or cyclists or used in other fields where an effective protection of the user's body must be obtained.

Figure 1:
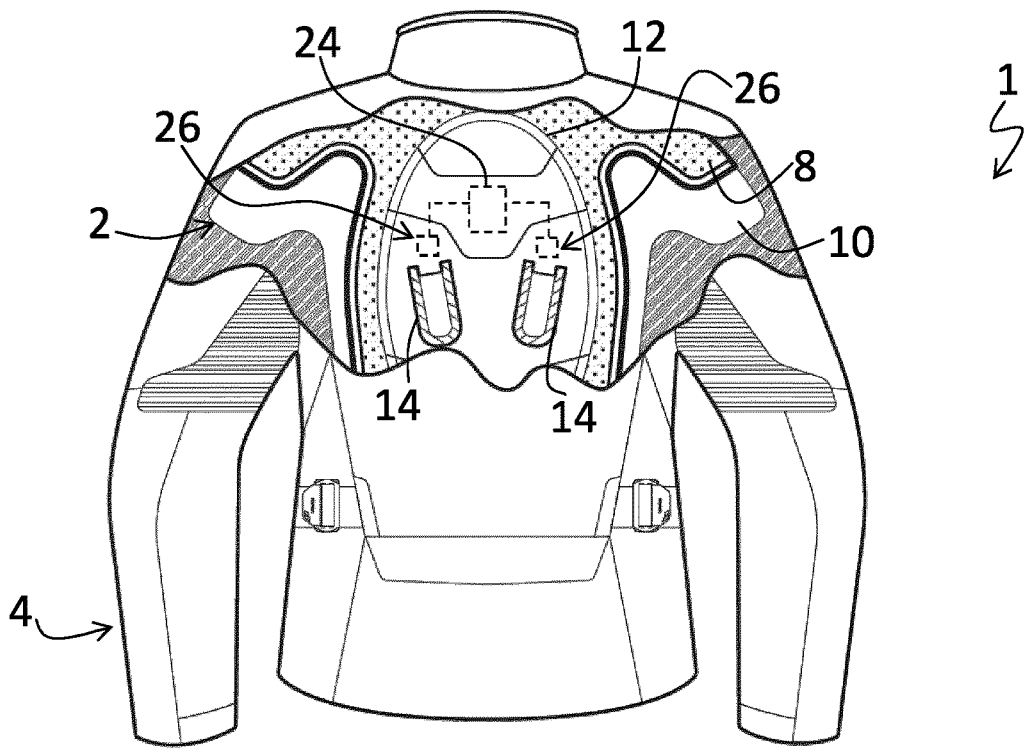
FIG. 1 shows a partially sectioned rear view of an embodiment of the wearable protection device according to the present invention in a rest condition.
Figure 2:
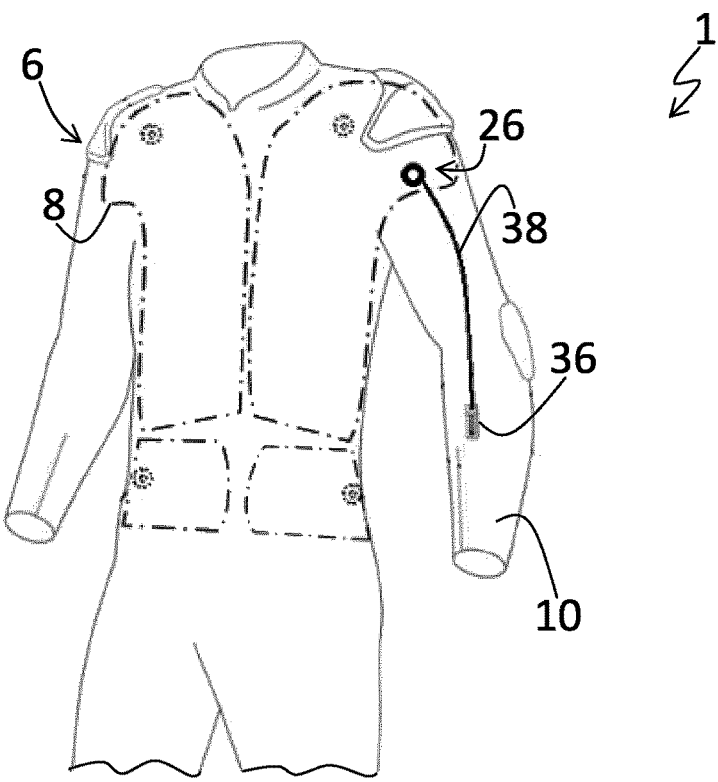
FIG. 2 shows a perspective view of another embodiment of the wearable protection device according to the present invention.
Figure 3:
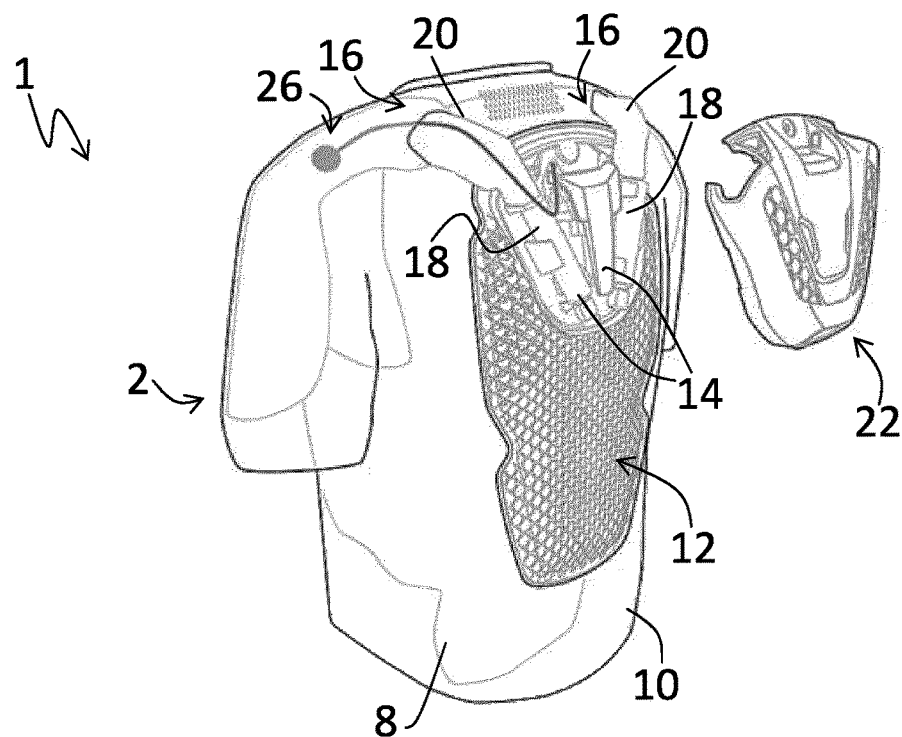
FIG. 3 shows a perspective and partially exploded rear view of a further embodiment of the wearable protection device according to the present invention.

As shown in FIGS. 1-3, the wearable protection device 1 can be a garment, for example a vest 2 (see FIGS. 1 and 3), designed to be coupled with a motorcyclist jacket 4, or a motorcyclist suit 6, (see FIG. 2).

The wearable protection device 1 comprises at least one inflatable bag 8 configured to assume alternately a rest configuration, in which it is in a deflated state, and an active configuration, in which it is in an inflated state.

The inflatable bag 8 is preferably intended to protect the shoulders and/or the chest and/or the sides and/or the back of the user.

According to alternative embodiments of the invention, not shown in the figures, the wearable protection device 1 may be provided with a plurality of independent inflatable bags 8.

The at least one inflatable bag 8 can be an OPW (one piece woven) bag (well known in the art and thus not described in detail in the present description) or can be formed by two polymeric sheets welded at their edge portions in a discontinuous way.

Moreover, the inflatable bag can have a knitted body covered by proper coatings.

These kinds of inflatable bags can have different deflation times after having been inflated and they can also be provided with one or more deflation valves, not shown in the figures, for the selective deflation thereof.

For example, these kinds of inflatable bags can have a deflation time comprised between 5-7 seconds, which is a time chosen according with the safety standards.

In alternative, the at least one inflatable bag 8 can also consist of an airtight bag, for example a bag formed by two polymeric sheets continuously welded at their edge portions.

This kind of inflatable bag is different from the previous ones, since it is suitable to stay in an inflated status for a longer period of time.

Figure 7:
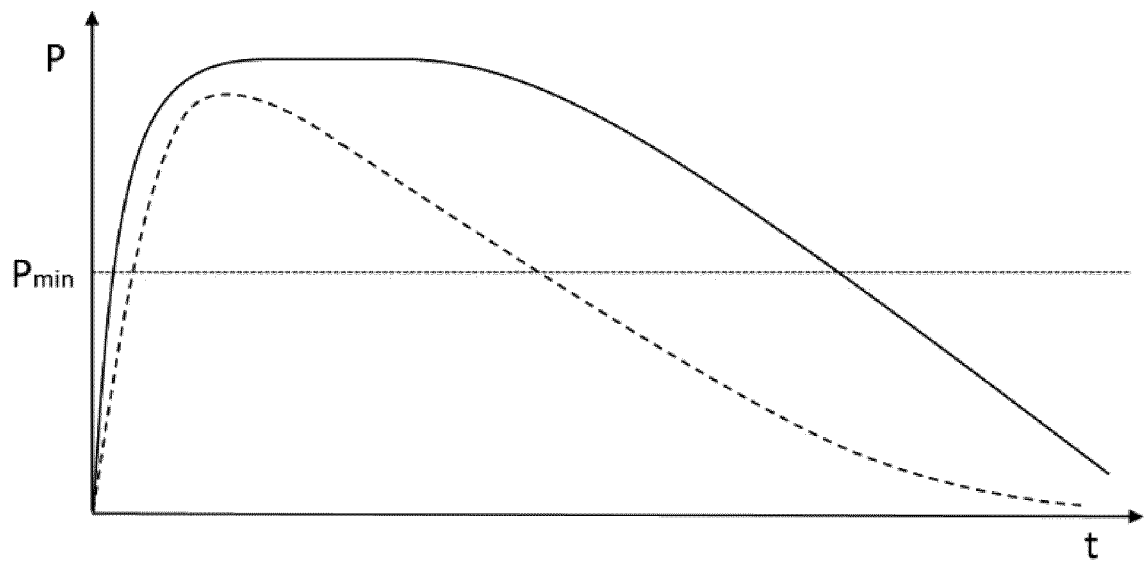
FIGS. 7 and 8 show two diagrams concerning the variations of the internal pressure of the inflation fluid inside the inflatable bag after the inflation thereof for two different kinds of inflatable bags.
Figure 8:
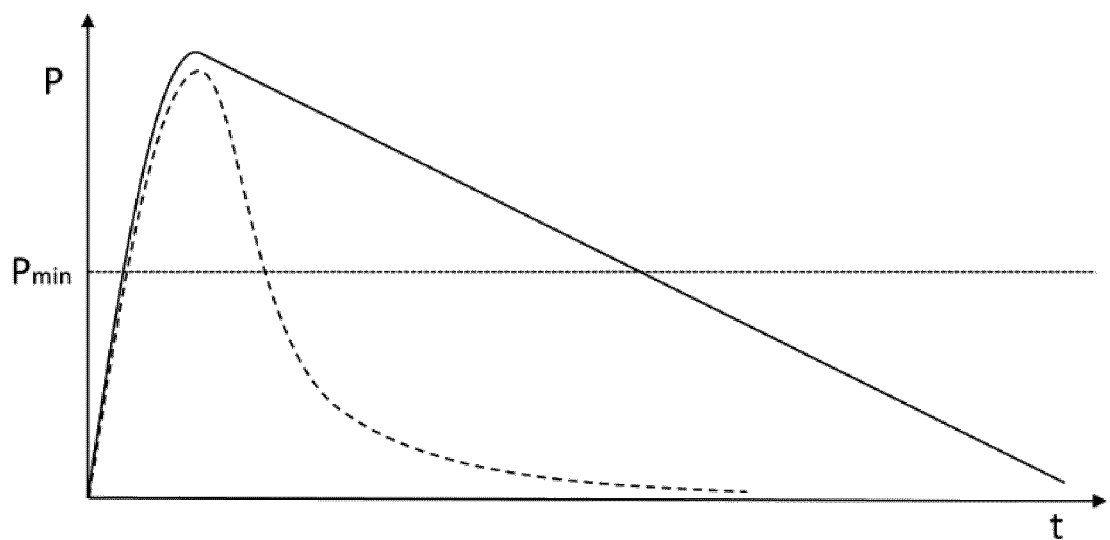

In the diagrams of FIGS. 7 and 8, the solid lines represent the variation of the pressure (P) exerted by the inflation fluid inside the inflatable bag, once it has been activated, in function of the time (t), respectively for an intact airtight bag and an intact non-airtight bag.

The wearable protection device 1 can comprise a rigid or semi-rigid back protector 12, shown in FIGS. 1 and 3, for the protection of the back of the user and applied on an outer surface 10 of the wearable protection device 1.

The wearable protection device 1 also comprises inflation means 14 designed to inflate the inflatable bag 8, in case a danger situation is detected.

The inflation means 14 are in fluid communication with the inflatable bag 8 and are configured to introduce therein an inflation fluid once they have been triggered.

The inflation means 14 are triggered in case a danger situation for the motorcyclist is detected, as for example a fall or an impact, in the way described below.

Advantageously, the inflation means 14 are connected to the inflatable bag 8 at a connecting end 16. As better shown in FIG. 3, the inflation means 14 comprise at least one gas cartridge 18, preferably two gas cartridges 18, connected to a duct 20 of the inflatable bag 8.

These gas cartridges can be chosen from the group comprising pyrotechnic inflators, compressed gas inflators and hybrid inflators. As it is well known in the art, in pyrotechnic inflators a pyrotechnic charge is used to ignite the combustion of a gas generating material to provide inflation gas. Compressed gas inflators in turn use a minimal amount of pyrotechnic material to open a sealed chamber to release the inflation gas from a compressed state.

Hybrid inflators use a combination of combustion and compressed gas storage to provide the inflation gas needed to fill the inflatable bag 8.

Figure 4:
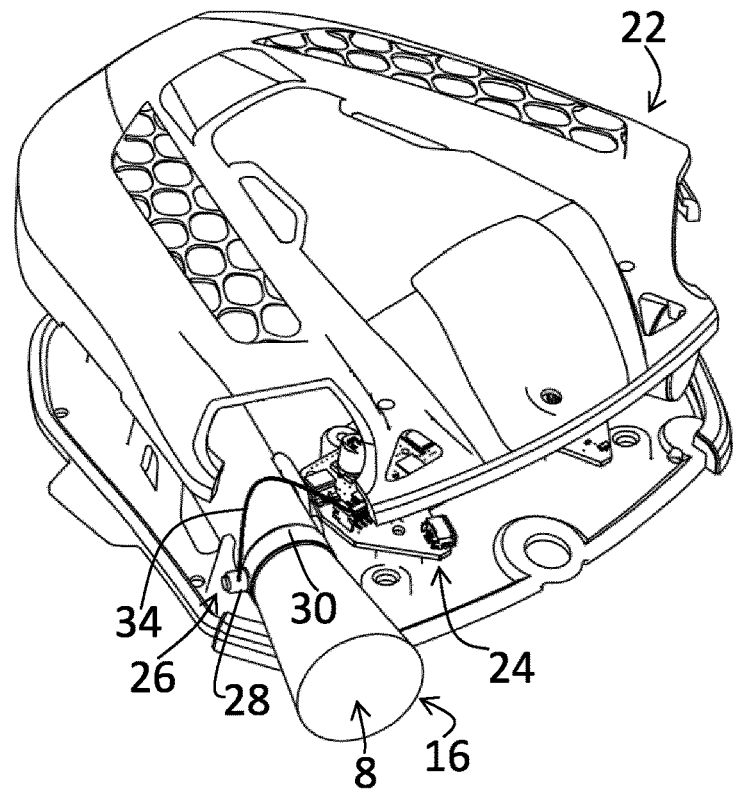
FIG. 4 shows a perspective and partially exploded view of a shell of the wearable protection device provided with a first embodiment of the pressure detecting device according to the invention.
Figure 5:
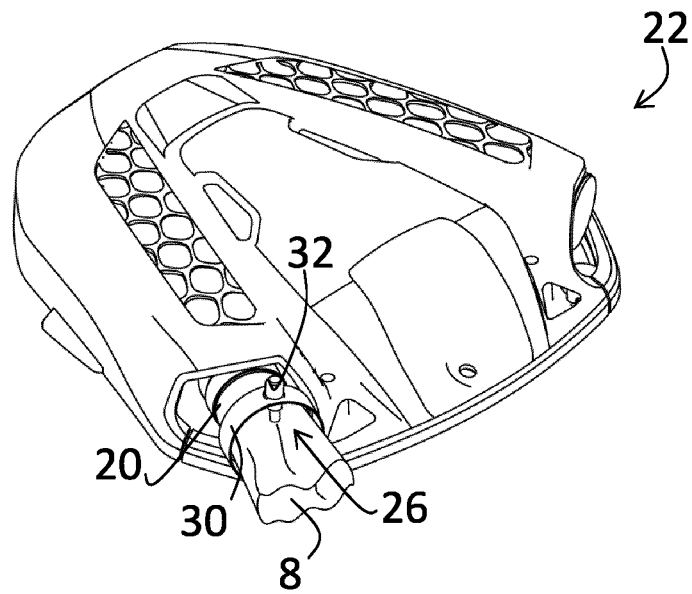
FIGS. 5 and 6 show respective perspective views of a shell of the wearable protection device in two different operative configurations, the shell being provided with a second embodiment of the pressure detecting device according to the invention.
Figure 6:
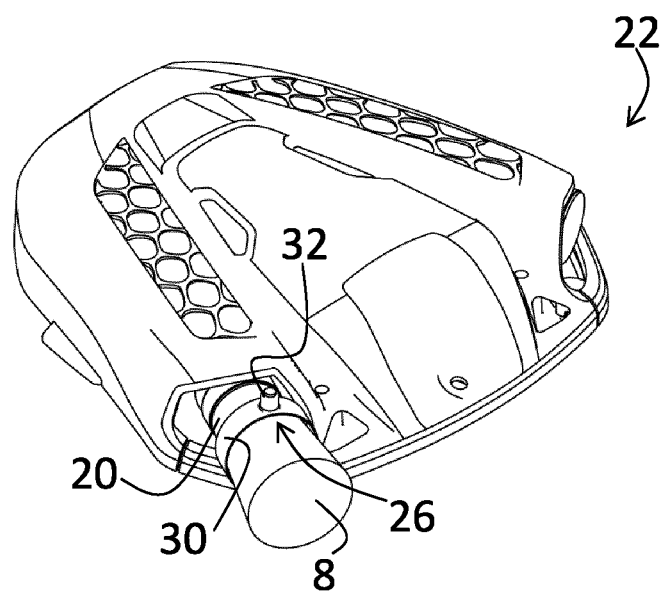

As shown in FIG. 3, the cartridges 18 can be positioned inside a shell or cover 22 which is mounted on the back protector 12. The shell 22 is also illustrated in FIGS. 4-6. In a further embodiment (not shown in the enclosed figures) the shell 22 is directly applied on the outer surface of the wearable protection device.

In alternative, the cartridges can be included inside the fabric of the wearable protection device 1 or in some cases inside the inflatable bag 8.

The inflation means 14 can be electronically controlled by a control unit 24, schematically shown in FIG. 1 and in detail in FIG. 4 but deemed to be present also in the other embodiments of the wearable protection device 1. The control unit 24 has the function to constantly monitor the movements of the motorcyclist in order to promptly detect a danger situation.

In this regard, the wearable protection device 1 comprises at least one sensor, not shown in the figures, for detecting forces acting on the wearable protection device 1. Preferably, the wearable protection device 1 comprises a plurality of sensors of this type, which are connected to the control unit 24 and positioned on the wearable protection device 1.

These sensors can comprise an accelerometer, designed to detect the accelerations acting on the wearable protection device 1, and/or a gyroscope, designed to detect movements and orientation of the wearable protection device 1.

The control unit 24 is able to compare at regular time intervals the data detected by the sensors with an algorithm pre-loaded inside it. If, on the basis of this algorithm, the data detected by the sensors indicate a danger situation, like for example a loss of control of the motorcycle on which the motorcyclist is travelling or some other anomaly, the control unit 24 transmits a triggering signal to the inflation means 14 for inflating the at least one inflatable bag 8.

As "danger situation" should be intended a situation wherein the wearable protective device 1 undergoes a sudden acceleration/deceleration and/or a sudden variation in its orientation and in its angular velocity.

As an alternative embodiment not shown in the figures, the inflation means 14 can be mechanically activated by utilizing an activation cable connecting the wearable protection device to the motorcycle; such a cable actuates the inflatable bag 8 following a separation of the motorcyclist by the motorcycle, typically caused by a fall and/or an impact.

As a result of the activation of the inflation means 14, the inflatable bag 8 moves from its rest configuration to the active or inflated configuration.

According to the present invention, the wearable protection device 1 comprises at least one pressure detecting device 26 associated with the inflatable bag or bags 8, as shown in FIGS. 1-6.

The pressure detecting device 26 is configured for directly or indirectly detecting the pressure of the inflation fluid inside the inflatable bag 8, in particular for detecting the pressure of the inflation fluid inside the inflatable bag after triggering of the inflation means 14.

As "direct detection" of the pressure inside the inflatable bag 8 it is intended that the pressure detecting device 26 is configured to directly measure the internal pressure of the inflatable bag.

As "indirect detection" of the pressure inside the inflatable bag 8 it is intended that the pressure detecting device 26 is configured to detect physical parameters of the inflatable bag 8 which are correlated to the inner pressure of the inflatable bag 8. An example of such physical parameters can be the spatial deformation of the inflatable bag 8.

In detail the pressure detecting device 26 comprises at least one pressure sensor, which can have different configurations. The at least one pressure sensor can be one or more pressure sensors.

The pressure sensor 28 can be selected from the group consisting of electromagnetic sensors, piezoelectric sensors, capacitive sensors, and piezoresistive sensors. An example of this pressure sensor 28 is shown in FIG. 4..

This pressure sensor is intended to directly detect the pressure inside the inflatable bag 8 at periodic intervals and to generate a series of pressure data.

As shown in FIG. 4, the pressure sensor 28 can be mounted on a support element 30, preferably a ring made of non-elastic fabric, positioned at the connecting end 16 between the inflation means 14 and the inflatable bag 8.

Alternatively, the pressure sensor 28 can be directly applied on the inflatable bag 8.

In alternative, the pressure sensor can consist of a mechanical device associated with the inflatable bag 8 and designed to mechanically switch once a predetermined threshold pressure value has been reached inside the inflatable bag 8. A mechanical pressure sensor is indicated by the reference number 32. Thus, this sensor 32 is configured to indirectly detect the pressure inside the inflatable bag 8.

This pressure sensor 32 is shown in detail in FIGS. 5 and 6, wherein the inflatable bag 8 is illustrated, respectively, in the deflated and inflated configuration.

As it can be seen, also this pressure sensor 32 can be positioned at the connecting end 16 between the inflation means 14 and the inflatable bag 8 and can comprise, for example, a mechanical button, which can be mounted on a support element 30 of the type described above.

The support element 30 is positioned on an end of the inflatable bag 8 so that when this latter is inflated it is suitable to get in contact with the button so as to move it from a first position, see FIG. 5, to a second position, see FIG. 6.

Similarly, when the inflatable bag 8 deflates it is no longer in contact with the button, which can return on its first position.

As a consequence, in this case only two pressure signals are generated. The first signal is generated when the button passes from the first position to the second position and the second signal is generated when the button passes from the second position to the first position. The first position will signal that the inflatable bag is fully or partially deflated and the second position will signal that the inflatable bag is fully inflated.

Other kinds of sensors intended to indirectly detect the pressure inside the inflatable bag 8 can be strain gauge sensors or similar, which are not shown in the figures.

Despite the type of sensors used, the pressure detecting device 26 can be connected to a control unit which is configured to compare the data received from the pressure detecting device 26 with pressure reference data.

According with the illustrated embodiments, in particular that of FIG. 4, the pressure detecting device 26 is connected to a control unit 24, for example by a plug 34 or even by a wireless connection, which is separate from the pressure detecting device 26.

This control unit 24 can be the same processor described above and configured to trigger the inflation means 14 of the inflatable bag 8.

Therefore, in this embodiment the control unit 24 has implemented an algorithm for controlling the activation of the inflation means 14 and another algorithm for elaborating the pressure data received from the pressure detecting device 26 and comparing them with the pressure reference data.

In alternative, the control unit 24 can be integrated in the pressure detecting device 26. This particular embodiment is particularly useful when the activation of the inflation means 14 is mechanically controlled.

In both cases, the control unit 24 comprises a memory for storing the pressure reference data. Alternatively, the pressure reference data can be stored as status word in the algorithm running on the control unit.

The pressure data detected by the pressure detecting device 26 can be stored in the above mentioned memory or in an additional memory of the control unit 24. In this way the detected data are also available for being processed in a later moment.

The pressure reference data are exemplary data obtained from the evaluation of the variation of the internal pressure of a reference inflatable bag in a large number of crush tests. The reference inflatable bag is a bag which preferably has undergone a single inflation, without showing tearings or damages.

The pressure reference data are linked to different features of the inflatable bag and of the inflation means, namely:
- the volume of the inflatable bag;
- the type of the inflatable bag;
- specifications of the cartridge (pressure of the gas that has to be inflated in the bag, type of gas, number of moles).

As a first operative mode, the control unit 24 can be configured to compare a peak value of pressure with a reference peak value of pressure stored in the memory.

The detected peak value of pressure corresponds to one of the pressure data transmitted by the pressure detecting device 26 to the control unit 24; once received, this value is processed by the control unit 24 as peak value and compared with the reference peak value taken for an inflatable bag having the same features of the inflatable bag 8 of the present wearable protection device 1.

As a second operative mode, the control unit 24 can be configured to compare the pressure value detected at a predetermined time during deflation of the inflatable bag 8 with a reference pressure value ($P_{min}$) stored in the memory.

In this case, the algorithm of the control unit 24 is configured to process a pressure value taken at a certain time during deflation, for example seven seconds after the triggering of the inflation means 14, with a reference deflation pressure value taken at the same time for an inflatable bag having the same features of the inflatable bag 8 of the present wearable protection device 1.

In case of a mechanical pressure sensor 32, the detected pressure value and the reference deflation value stored in the control unit 24 will be associated with the signals generated by the corresponding sensor in its first or second position.

For example, the algorithm of the control unit will verify if, at a predetermined time during the deflation of the bag, indicatively seven seconds, the sensor is in its first position, wherein the bag is fully or partially deflated, or in the second position, wherein the bag is inflated. Should the sensor being in the first position, this will be interpreted by the control unit as indicia that the bag has undergone a too rapid deflation and thus it cannot be reused. The control unit will emit a proper warning signal.

Conversely, if after the predefined time interval, the sensor is in its second position, this will be interpreted by the control unit as indicia that the bag can be reused. No warning signal will be emitted.

Additionally, the algorithm of the control unit 24 can be configured to process the time occurred to reach a predetermined reference pressure value during deflation of the inflatable bag 8 on the basis of the data detected by the pressure detecting device 26.

Moreover, the algorithm of the control unit 24 can be configured to process at regular intervals of time the data detected by the pressure detecting device 26 so as to evaluate the difference between such data and reference data taken at the same intervals of time during deflation.

As a further operative mode, the control unit 24 can be configured for detecting a variation of pressure, on the basis of the data received by the pressure detecting device 26, for an airtight bag or for a non-airtight bag.

In this case, the control unit 24, on the basis of the data detected by the pressure detecting device 26, is able to verify if an anomalous loss of pressure has occurred after the triggering of the inflation means 14.

As above mentioned, in FIGS. 7 and 8 the variation of the internal pressure of an inflatable bag 8 after the triggering of the inflation means 14, as detected by the pressure detecting device 26 and processed by the control unit 24, is schematically shown in dashed lines.

In particular, in FIGS. 7 and 8 there are represented in dashed lines the pressure data respectively of a damaged airtight inflatable bag and a non-airtight inflatable bag. In the same figures, a possible example of reference data are shown in solid lines, as indicated above.

As a matter of fact, in the diagrams of FIGS. 7 and 8 the deviation between the detected data and the reference data is relevant and exceeds the threshold value; an inflatable bag having these pressure values should be replaced.

Obviously, the data detected by the pressure detecting device 26 can be processed in different modes by the control unit 24, by changing the algorithm thereof. By making the comparison between the detected pressure data and the reference pressure data, a warning signal can be generated if a deviation between the data exceeds a predetermined threshold value.

A deviation exceeding the threshold value means that the inflatable bag 8, after having been inflated, is deflating too rapidly. This occurrence is a proof that the inflatable bag 8 has undergone damages and thus that, in order to guarantee a high safety level, it cannot be reused in the wearable protection device 1.

The wearable protection device 1 can be provided with signaling means 36, better shown in FIG. 2, associated with the control unit 24. The signaling means 36 can be integrated in the control unit 24 or connected thereto by a wire connection 38 or a wireless connection.

In FIG. 2, there is illustrated the embodiment wherein the signaling means 36 are connected to a pressure detecting device 26 having the control unit integrated therein. If a deviation between the detected pressure data and the reference pressure data is detected by the control unit 24, the signaling means 36 are activated, for example by an activation signal from the control unit 24.

In this way, the user is informed with the warning signal about the necessity of replacing the inflatable bag 8, before reusing the wearable protection device 1.

Further, the signaling means 36 can also generate a warning signal in case a loss of pressure is detected for an airtight bag 8.

The warning signal can be a visible signal or an audible signal, thus the signaling means 36 can comprise for example LEDs, displays or speakers.

Preferably, these signaling means 36 are positioned in parts of the wearable protection device 1 where they can be seen or heard by the user in an easier way, as for example the outer surface 10 of the wearable protection device 1, as shown in FIG. 3.

In the case the inflatable bag 8 has not undergone any damages during inflation, the signaling means 36 are not activated by the control unit 24, and thus the user knows that the replacement of the inflatable bag 8 is not necessary.

In alternative, the signaling means 36 could be activated by the control unit 24 even if no damages of the inflatable bag 8 are detected, thus emitting a signal which is different from the warning signal emitted in case of damages to the inflatable bag 8.

For example, if the signaling means 36 comprise one or more LEDs, they can signal the absence of damages with a green light and the presence of damages with a red light.

Another object of the present invention is a method for evaluating if an inflatable bag 8 of a wearable protection device 1, of the type described above, is reusable once it has been inflated.

This method comprises the following steps:
directly or indirectly detecting the pressure inside the inflatable bag 8 by the pressure detecting device 26, in particular after the triggering of the inflation means 14;
comparing the detected pressure data with the pressure reference data stored in the control unit 24;
generating respective warning signals if a deviation between the detected pressure data and the reference pressure data exceeds a predetermined threshold is detected.

At this point of the disclosure it is clear how the predefined objects are achieved with the wearable protection device according to the present invention.

In particular, by means of the pressure detecting device, in cooperation with the control unit connected thereto, the wearable protection device is able to detect potential damages on the inflatable bag after inflation and to communicate it to the user.

The user can be advantageously informed if the bag, due to the detected loss of pressure, needs to be replaced. At the same time, if no loss of pressure is detected, the user can be informed about the possibility to reuse the wearable protection device in safety manner, without needing to replace the inflatable bag.

Thus, the automatic check of the bag status allows the user to save time, to use the wearable protection device always in safety conditions and to avoid the user to replace the inflatable bag if unnecessary.

Moreover, the addition of the pressure detecting device does not cause an increase of weight and bulk of the wearable protection device and it does not affect the normal functioning of the inflatable bag which is independent from the pressure detecting device.

The person skilled in the art may, in order to satisfy specific requirements, make modifications to and/or replace elements described with equivalent elements, without thereby departing from the scope of the accompanying claims.

For example, the skilled person could replace the pressure sensors described with other equivalent pressure sensors, or place the sensors in different positions without thereby departing from the scope of the accompanying claims.

The invention claimed is:

1. A wearable protection device comprising:
at least one inflatable bag configured to assume alternately a rest configuration, wherein the at least one inflatable bag is in a deflated state, and an active configuration, wherein the at least one inflatable bag is in an inflated state;
inflation means in fluid communication with the at least one inflatable bag and configured to introduce therein an inflation fluid once the inflation means have been triggered;
at least one pressure detecting device associated with the at least one inflatable bag and configured for measuring pressure data by directly or indirectly detecting a pressure of the inflation fluid inside the at least one inflatable bag after triggering of the inflation means; and
a control unit configured to receive, from the at least one pressure detecting device, pressure data of the inflation fluid inside the at least one inflatable bag, and to compare said pressure data with pressure reference data stored in the control unit.

2. The wearable protection device according to claim 1, characterized in that the control unit is connected to the at least one pressure detecting device, said control unit being further connected to one or more sensors intended to detect forces acting on the wearable protection device for triggering the inflation means.

3. The wearable protection device according to claim 1, characterized in that said control unit is integrated in the at least one pressure detecting device.

4. The wearable protection device according to claim 1, characterized in that the control unit comprises a memory wherein the pressure reference data are stored.

5. The wearable protection device according to claim 4, characterized in that the control unit is configured to store the pressure data received by the at least one pressure detecting device in said memory.

6. The wearable protection device according to claim 1, characterized by comprising signaling means associated with said control unit and configured to emit a warning signal if a deviation between the pressure data detected by the at least one pressure detecting device and the pressure reference data stored in the control unit exceeds a predetermined threshold.

7. The wearable protection device according to claim 1, characterized in that the control unit is configured to compare a peak value of pressure detected inside said at least one inflatable bag with a reference peak value of pressure stored in the control unit.

8. The wearable protection device according to claim 1, characterized in that said control unit is configured to compare a pressure value detected at a predetermined time during deflation of the at least one inflatable bag with a reference deflation pressure value stored in said control unit.

9. The wearable protection device according to claim 1, characterized in that the control unit is configured to detect a variation in the pressure inside the at least one inflatable bag once the at least one inflatable bag has been inflated on the basis of the data received by the at least one pressure detecting device.

10. The wearable protection device according to claim 1, characterized in that the at least one pressure detecting device comprises one or more pressure sensors connected to the control unit.

11. The wearable protection device according to claim 10, characterized in that said one or more pressure sensors are selected from the group consisting of electromagnetic sensors, piezoelectric sensors, capacitive sensors, and piezoresistive sensors;
said one or more pressure sensors being configured for directly detecting the pressure data inside said at least one inflatable bag for a predetermined time period at periodic intervals and for sending the pressure data to the control unit.

12. The wearable protection device according to claim 10, characterized in that said one or more pressure sensors consists of a mechanical device associated with said at least one inflatable bag and designed to mechanically switch once a predetermined threshold pressure value has been reached inside the at least one inflatable bag, said one or more pressure sensors being configured to indirectly detect the pressure inside the at least one inflatable bag.

13. The wearable protection device according to claim 1, wherein the detecting of the pressure of the inflation fluid is carried out during a period from the rest configuration to the active configuration.

14. The wearable protection device according to claim 1, wherein when the at least one inflatable bag is in a deflated state, the detecting of the pressure of the inflation fluid is carried out during a period from the rest configuration to the active configuration and a period from the active configuration to the rest configuration.

15. The wearable protection device according to claim 1, wherein the device is configured to be included in a garment for motorcyclists.

16. A method for evaluating whether the at least one inflatable bag of the wearable protection device of claim 1 is reusable once the at least one inflatable bag has been inflated, the method comprising the steps of:
- directly or indirectly detecting the pressure inside the at least one inflatable bag by the at least one pressure detecting device after the triggering of the inflation means;
- comparing the pressure data detected by said at least one pressure detecting device with reference pressure data stored in the control unit;
- generating respective warning signals for a user of the wearable protection device if a deviation between the detected pressure data and the reference pressure data exceeding a predetermined threshold is detected.

* * * * *